United States Patent [19]
Ternes

[11] 4,085,666
[45] Apr. 25, 1978

[54] ROOF-TOP OBSERVATION CENTER FOR AUTOMOBILES

[76] Inventor: William A. Ternes, 1122 Three Mile Dr., Grosse Pointe Park, Mich. 48230

[21] Appl. No.: 641,114

[22] Filed: Dec. 15, 1975

[51] Int. Cl.² ............................................. B60H 1/26
[52] U.S. Cl. ................... 98/2.14; 296/137 R; 350/307
[58] Field of Search ............... 98/2.14, 2.15; 350/302, 350/307; 296/137 R

[56] References Cited
U.S. PATENT DOCUMENTS

| | | | |
|---|---|---|---|
| 1,539,998 | 6/1925 | Ford | 98/2.14 |
| 1,983,979 | 12/1934 | Graham | 98/2.14 |
| 2,073,159 | 3/1937 | Lintern et al. | 98/2.14 |
| 2,281,102 | 4/1942 | Lowman | 350/302 |
| 2,645,159 | 7/1953 | Darroch | 350/302 |
| 3,463,578 | 8/1969 | Smith | 350/302 |
| 3,738,621 | 6/1973 | Anderson | 98/2.14 X |
| 3,910,689 | 10/1975 | Yamashita et al. | 350/302 |

*Primary Examiner*—William E. Wayner
*Assistant Examiner*—William E. Tapolcai, Jr.
*Attorney, Agent, or Firm*—Harness, Dickey & Pierce

[57] ABSTRACT

An observation center for an automobile comprises a roof top compartment located approximately above the driver's head and arranged to provide him with means to observe the scene to the rear of the vehicle and also is provided with exterior roof top signal means to enable others to observe the driver's signalled intention to stop or to turn, as well as signals in the form of parking, side or running lights, and emergency flashers. Preferably, the center includes a ventilation means that takes advantage of the drag produced by the shape of the compartment.

16 Claims, 8 Drawing Figures

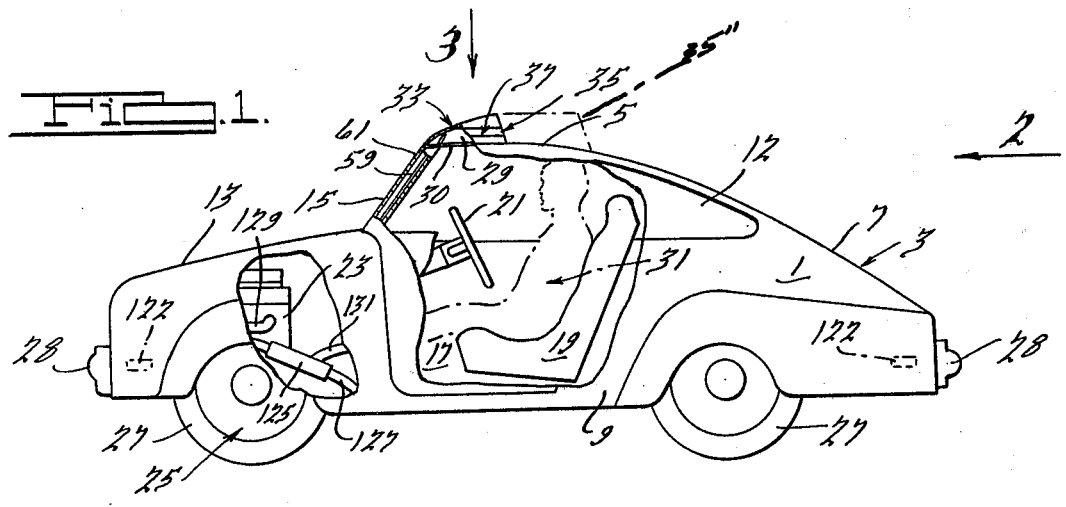

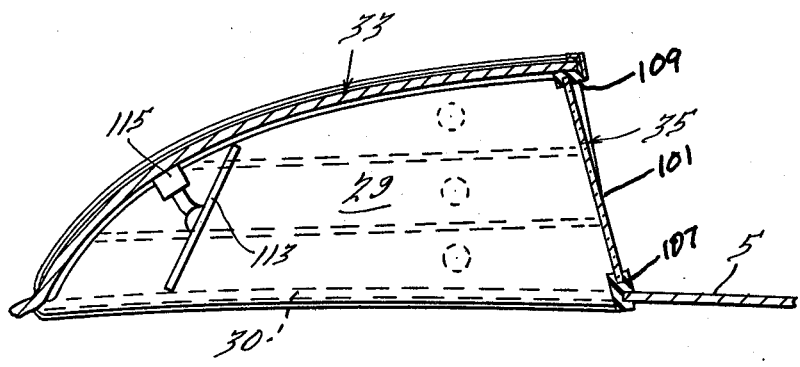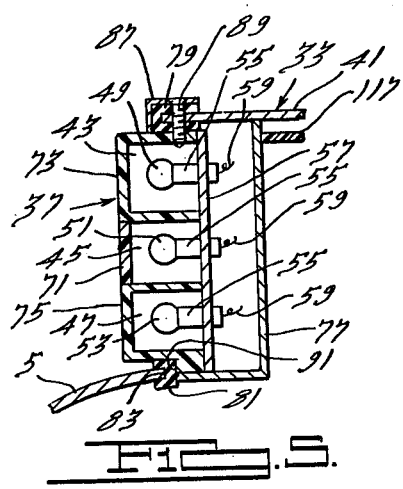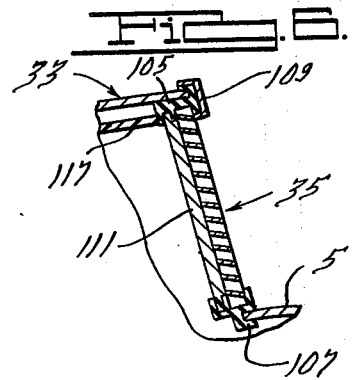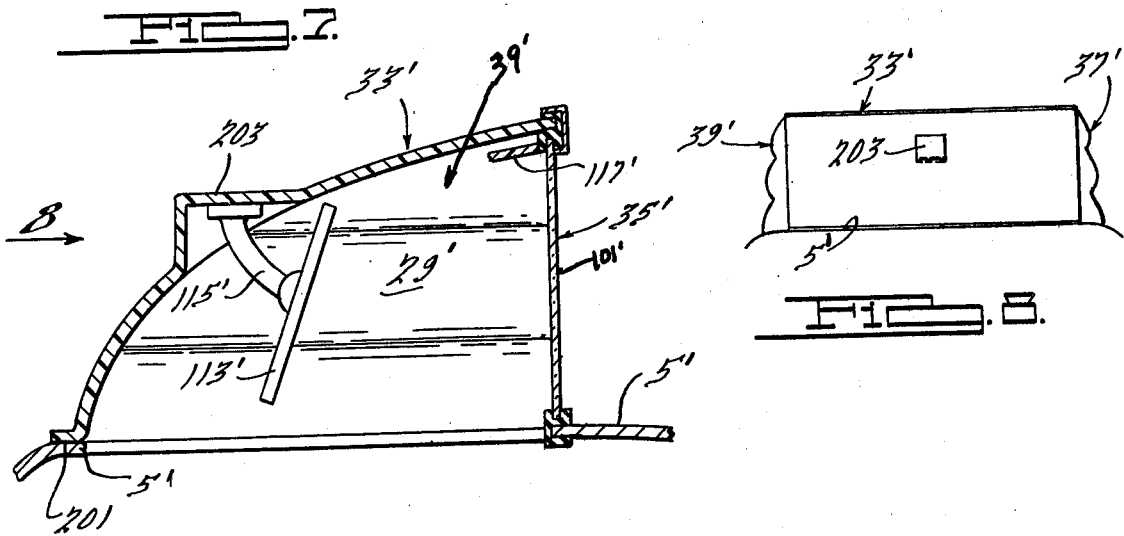

ROOF-TOP OBSERVATION CENTER FOR AUTOMOBILES

SUMMARY OF THE INVENTION

It is the purpose of this invention to provide means to significantly increase the safety and comfort of automobile driving without significantly increasing the per vehicle cost of manufacture.

The invention accomplishes this purpose by means of a novel roof top compartment which serves as a center for the display of signals for observation by others and a center from which the driver is able to observe the vista to the rear of the automobile. Preferably, the compartment includes controllable vent openings providing means to regulate the level of comfort within the automobile.

In terms of safety, the invention provides several advantages over conventional passenger automobile designs. The roof top signals are visible from both the front and rear as well as from both sides of the vehicle and, since they are located at a much greater height than conventionally located signals, they are easily visible from greater distances and are not easily obstructed by intervening automobiles, etc. Drivers in automobiles several cars behind or to the side of one equipped with the invention will notice operation of the stop, turn, or emergency signals and thus be warned valuable seconds in advance as compared with present equivalent signal systems which are usually located at the front and rear ends of the vehicle and two or three feet above road level. Operation of the roof top signals can be observed peripherally by the driver himself so that he can be sure that they are functioning properly and such observation in and of itself will tend to maintain him in a more alert frame of mind during the periods that he is braking, turning, or facing an unusual situation calling for the use of the emergency flasher.

Further, in terms of safety, the roof top compartment of the invention has a rearwardly facing window that is located above the roof of the automobile and in the line of sight of a suitable rear image reflection or optical system for the driver. This window can be located ahead of, above, or just behind the driver's head; and, in the latter case, the driver can by elevating himself slightly and turning his head see directly to the rear without the aid of the optical system. In preferred forms, the optical system is simply a single plane mirror that is located above the windshield thereby eliminating the usual mirror created blind spot in forward vision. The compartment window is located ahead of the rear ends of the windows in the sides of the automobile so that between the rear and side views provided by the compartment window and the side views provided by the side windows the driver is always able to see passing vehicles, etc., i.e., there are no blind spots corresponding to those in present automobiles in which passing vehicles are momentarily lost behind the opaque rear sections of the automobiles between the side and rear windows. The increased height of the rear vision system of the invention, as compared with conventional systems of mirrows and rear windows in the body and side mounted exterior mirrors, also gives the driver a more comprehensive and more readily observed and less obstructed view of the scene behind him.

In terms of cost of manufacture, as will become apparent hereinafter, the roof top compartment of the invention is designed to be incorporated into production automobile structures or, alternatively, as an add-on, with minimum changes in structure and manufacturing techniques. Certain advantages of the invention make it feasible to introduce cost saving changes in the automobile structure which in the aggregate are likely to exceed the added cost of the compartment so that the net result may very well be a reduction in cost of manufacture of the automobile. For example, the roof top signal system contemplates duplicate sets of signals, one on each side of the roof top compartment, instead of the usual four sets of signals and accompanying wiring harness, bezels, bumper adaptations, etc., now used (two in front and two in the rear). Further, the present side or running lights in the front and rear fenders may be eliminated and replaced by combination side and parking lights in the roof top compartment. The improved rear visibility provided by the invention eliminates the need for exterior side mirrors and may even make it possible to eliminate the conventional rear window in the automobile body. Also, the ventilation openings provided by the invention will eliminate the need for the relatively expensive no-draft side windows which many believe should be reincorporated into automobile bodies to solve special ventilation problems that have arisen during their absence from automobiles manufactured in recent years. It is also possible that the ventilation openings of the present invention will make it feasible in low price cars to eliminate the conventional "hot water" heating system and replace it with a less expensive heat exchange system based primarily on pressure differential induced air flow past hot parts of the engine, such as components of the exhaust system.

Another aspect of the invention, which will be considered a significant advantage by many, is that it adds an entirely new section to the vehicle body that may be styled by automotive designers in numerous different, distinctive, and attractive ways that are aerodynamically sound to add to the unique ornamental appeal of the various models sold by automobile manufacturers making use of the invention.

From the maintenance standpoint, the invention has fewer lights to keep in working order and their position on the roof top protects them from damage so frequently caused to present signal lights by front-end or rear-end collisions.

Other features of the invention will become apparent in more detailed description which follows.

DESCRIPTION OF THE DRAWINGS

In the drawings

FIG. 1 is a side elevation, partly broken away, partly in section and to some extent diagrammatic, of a passenger vehicle having an observation center formed by a compartment in accordance with one form of the invention in which it is an integral factory manufactured part of the roof section of the automobile body;

FIG. 2 is a view taken from position 2 of FIG. 1 looking at the vehicle from the rear;

FIG. 3 is a top view taken from position 3 in FIG. 1 showing the compartment of the present invention but with adjacent parts of the vehicle broken away;

FIG. 4 is a cross section through a midportion of the compartment of this invention as taken along the lines 4—4 of FIG. 2;

FIG. 5 is a cross section through the signal light fixture at one end of the compartment of this invention as taken along the line 5—5 of FIG. 3;

FIG. 6 is a cross section through a ventilator portion of the compartment of this invention as taken along the line 6—6 of FIG. 2;

FIG. 7 is a simplified view with parts omitted, similar to FIG. 4, but showing a modified form of the invention wherein the compartment is not originally integral with the roof 5 but is molded non-metallic "add-on" element which is secured by suitable means to the roof to cover an opening in the roof; and FIG. 8 is a view on a reduced scale from position 8 of FIG. 7 showing a small outwardly pressed protuberance in the compartment to provide space for a rear view mirror support bracket.

DESCRIPTION OF THE INVENTION

A passenger automobile 1 has a body 3 that includes a roof section 5, a back section 7, left and right side sections 9 and 11 with windows 12 (and doors that are not shown), a front section 13, and a windshield section 15. An interior passenger compartment 17 is formed by and inside the body and has seats for passengers, such as the driver's seat 19 that is illustrated, as well as the usual vehicle controls, including steering wheel 21, and vehicle condition indicators (not illustrated). An internal combustion engine 23 located in front section 13 is illustrated as supported by the vehicle chassis 25 which includes wheels 27. Bumpers 28 are illustrated at the front and rear of the vehicle.

In accordance with the present invention, an observation center is provided by a roof top compartment 29 that extends transversely across, preferably, substantially the full width of the vehicle and is fully open on its bottom side 30 so that it forms, in effect, an elevated section of the passenger compartment 17. At least the forward part of the compartment is located to the front of a driver 31 and, in most designs, will be as close to the top edge of the windshield section 15 as manufacturing considerations permit. In addition to the open bottom side 30, the compartment 29 is defined by a curved or streamlined combination top and front section 33, a substantially vertical rear section 35, and left and right side sections 37 and 39. The rear section is connected at its bottom edge to the front edge of the roof section 5. The compartment 29 and roof section 5 together form the roof of the body 3 with the section 5 blending into the back or rear section 7 of the body in any manner desired by the body stylist.

In the embodiment of the invention shown in FIGS. 1-6, the top and front compartment section 33 is an integral part of the vehicle body and is in the form of a large cantilever type arch 41. In the case of metal bodies the arch 41 is initiated as a U-shaped slit in the roof metal and then formed by pressing the slit portion outwardly away from the balance of the roof section 5. When the arch section 41 is moved away from the roof section 5 it leaves, of course, open spaces at its opposite ends and an opening at the rear. These are closed by the left and right compartment side sections 37 and 39 and the rear is closed by the rear compartment section 35. While at the present time body roofs are formed almost exclusively of metal, it is apparent that the compartment is very well suited to be formed of non-metallic material, such as molded glass fibers or molded plastic material, and, in fact, could readily be an integral part of an entire body roof or an entire body itself that is molded of suitable material.

The side sections 37 and 39 are preferably designed to include signal light fixtures which may be constructed of transparent clear or colored materials (e.g. acrylic plastic material) currently used in the manufacture of external vehicle light fixtures and may generally follow the principles of construction and manufacture now used. The fixtures 37 and 39, however, are positioned and shaped to serve as complete (as shown) or partial closures or end walls for the opposite sides of the compartment 29 and therefore perform a structural function as well as the function of signaling driver intention and car position.

The fixture 37, illustrated in FIG. 5, will serve to illustrate in a rather crude and general way a principle of the invention, it being understood that numerous variations may be made in styling or in actual structure within the scope of the principle illustrated. The fixture 39 will ordinarily be the same as the fixture 37 but reversed so as to suit the other end of the compartment. As illustrated, the fixture 37 is formed primarily of plastic material and is shown having a top chamber 43, an intermediate chamber 45, and a lower chamber 47. It is contemplated that one of the chambers, such as 43, may be used as a chamber to give the stop light signal; another of the chambers, such as 45, may be used as a side running light and/or parking light; and another of the chambers, such as the lower chamber 47, may be used to provide the turn signal light. One or more of the chambers (or even an additional chamber) may be used to provide the flasher emergency signals. The chambers contain light bulbs 49, 51, and 53, respectively, which, for the sake of simple illustration, are shown as mounted in suitable sockets 55 that are carried by a backplate 57. The electrical wiring indicated at 59 forms a part of the automobile's usual wiring harness and electrical system and may be threaded down the interior of the side frame post 61 for windshield section 51 to tie into the remainder of the wiring harness and control switch elements of the electrical system. If desired, one or more of the bulbs may be made two-way or three-way so as to enable more than one of the chambers to be used for one or more given signal purposes (e.g., all three chambers could be illuminated when the driver applies pressure to the brake pedal). As is apparent from FIG. 4, each chamber has considerable length, (though less than all of the length may be utilized for signal lights if a designer so desires) and there is preferably significant width to the fixture so that it is clearly and easily visible from the rear of the vehicle as seen at 63 and 65 in FIG. 2. Thus, stop, turn, emergency, parking and/or running lights (side lights) are clearly visible from either side of the vehicle as well as from the rear. Furthermore, the fixtures 37 and 39 preferably project outwardly beyond the side edges of the arch 41, as seen at 67 and 69 in FIG. 3, so that the signals are visible to someone ahead of the automobile 1.

In FIG. 5 the outer wall 71 of the intermediate chamber 45 is shown as of a different material than the adjacent walls 73 and 75 of the upper and lower chambers 43 and 47. This is for the purpose of illustrating that the outer walls of each chamber may be of a different color, if that is the designer's preference. The electrical wiring 59 is hidden in a suitable manner (as is customary with conventional dome lights in the passenger compartment) within the interior of the compartment 29, as by a snap in place shield 77. The fixture 37 is secured in a weather tight condition by suitable gasket or seal means, such as illustrated by the top seal 79 which extends around the side edge of the arch 41 and the bottom seal 81 which extends around the inner edge 83 of the opening 85 that is sheared in the roof section 5 to form arch 41. Suitable molding, such as illustrated at 87, may be placed around the seal. The fixture is held in place by suitable fastening means, such as illustrated by the screw 89 that connects it to the arch 41 and by the outwardly facing shoulder 91 that engages the vertical inner face of the bottom seal 81. If desired, the fixture 37 may be connected by suitable screw means on its bottom side to the roof section 5. In addition to acting as an end closure for the compartment 29 and a signal means, the fixture serves as a bracing or structural component between the arch and the roof section.

The rear section 35 of the compartment 29 which extends between the inner faces 93 and 95 (FIG. 2) of the respective fixtures 37 and 39 is shown as somewhat inclined in the FIGS. 1, 3, 4, and 6 of the drawings since the length of the opening 85 in the roof section 5 will be somewhat longer than the longitudinal length of the arch 41 after it is bent upwardly to form the top and front section 33 of the compartment. Preferably, a set of louvers 97 and 99 is immediately adjacent the respective edges 93 and 95. The louvers may be formed of metallic or non-metallic material and it is contemplated that they may, if desired, be made integral with the side fixtures 37 and 39. Extending between the inner edges of the louver sections 97 and 99 is a pane 101 of clear or tinted glass or other material through which rear visibility will be optimum, the side edges of the pane 101 being set in suitable seals 103 to prevent leakage between the glass and the louvers 97 and 99. At the top and bottom edges the louvers and the glass are sealed to the section 33 and to the roof 5 at the top and bottom, respectively, as by seals 105 and 107 (FIG. 6) of a suitable construction, and trim molding of a suitable type, such as illustrated at 109, may be placed around one or both of the seals.

Suitable control means are provided to regulate or shut-off the flow of air through the louver sections 97 and 99. The drawings illustrate a simple sliding door 111 which moves horizontally toward the center line of the vehicle to expose as much of an opening through the louver section as is desired. The dotted line 111' in FIG. 2 illustrates that the door 111 controlling the louver section 97 has been shifted to open the left hand end of the louver section. The doors can be mounted in suitable tracks which may be formed as an integral part of the upper and lower seals 105 and 107 as illustrated in FIG. 6.

Properly aligned with the windowpane 101 is a rear view mirror 113 of the direct image reflection type in current use which is adjustably mounted on the arch 41 by means of a bracket 115, though other mounting arrangements (such as on the windshield) may be used as desired. The mirror 113 is illustrated as being almost as long as the width of the windowpane 101 when the vent doors 111 are wide open in order to obtain maximum visibility to the rear and to the side of the vehicle. At the vehicle designer's option the mirror may be made somewhat shorter.

The layer 117 that is shown partially in FIGS. 5 and 6 is intended to illustrate the use of an insulating layer adjacent or spaced slightly from the metal as is common practice in automobile body construction.

In the embodiment shown in FIGS. 7 and 8, the top and front section 33' corresponding to section 33 of the compartment 29' is separate from the roof section 5' and, for example, may be molded from suitable non-metallic material. In this case the outer layers of the compartment end sections 37' and 39' are shown as molded integrally with it (FIG. 8) and as comprising three curved sections (corresponding to chambers 43, 45, and 47) the bottom of which is shaped to blend into the roof section 5'. Though not illustrated, louver sections corresponding to sections 97 and 99 could be molded integrally with the sections 33', 37', and 39'. The compartment 29' is suitably secured as illustrated by the adhesive layer 201 to the roof section 5' of the vehicle. Since the section 33' is an add-on part of the rear section 35' may be truly vertical as illustrated. A small outwardly extending indentation 203 is shown in the member 331 as a mounting place for the mirror bracket 115'. This enables the mirror 113' to be adjusted slightly either vertically or longitudinally of the compartment if that proves to be desirable for optimum visibility and driver comfort. In other respects the embodiment of FIGS. 7 and 8 is substantially the same as that of FIGS. 1–6, i.e., there are signal light means inside and adjacent sides 37' and 39' that serve as signal means, there are ventilation sections corresponding to the louver sections 97 and 99, and even an insulation layer 117' corresponding to the insulation layer 117. It may be envisioned that the entire roof, including the compartment 29' and roof section 5' may be a one piece molding secured as an add-on part to a vehicle.

Due to the excellent rear visibility provided by the compartment 29 (or 20'), FIG. 2 illustrates the rear window 119 in phantom lines to show that it may be possible to safely eliminate it in some body designs where the visibility which it would provide would add nothing to that obtained by means of the compartment. FIG. 2 also illustrates the absence of the usual signal lights adjacent the area of the rear bumper 28, though concentric back up lights 121 and running lights 121*a* are illustrated. Side running lights 122 are shown in phantom lines since it is believed that they can be omitted in view of fixtures 37 and 39 which can be used to provide side running lights.

Referring to FIG. 1 and to the front section or engine compartment 13, the heater member 125 is shown as a part of the exhaust system 127 which is attached to exhaust manifold 129 and is intended to illustrate omission of the usual "hot water" heating system and the use of a manifold or exhaust gas heater to furnish hot air to a conduit 131 that will be controlled to open selectively into the passenger compartment 17 to a degree determined by the driver 31. This may be feasible in lower priced automobiles, at least, because the low pressure space immediately outside the louvers 97 and 99, created by drag as the air flows across the top 33, will serve as a powerful inducement for air flow across heater 125 and through conduit 131 into and across the passenger compartment 17 and out through the louvers. At standstill condition of the automobile a small fan (not shown) could be used to force air flow through the conduit 131. A valve or door (not shown) to determine the degree of opening of conduit 131 into the compartment 17 and the degree of opening of doors 111 for lower sections 97 and 99 will serve to illustrate means to regulate the rate of flow of heated air. It may be noted here that the high and forward location of window 101 will, regardless of the heating system used, tend to cause it to be at a relatively high temperature (as compared with rear window 119) and therefore tend to minimize frost-up or steam-up. Further, it is close enough to the driver so that he can easily reach it to clean it off. Of course, if desired, it can be provided with a defroster means as currently used in rear windows of automobiles.

While the louvers are preferably located in the rear section 35, it is recognized that some stylists or designers may prefer to form them in the sides 37 and 39 of the compartment 29. For example, vertical louvers opening to the rear would open into low pressure spaces so that the pressure differential between the compartment 17 and the outside would promote ventilating flow.

The phantom lines in FIG. 1 show the rear section 35" just behind the head of the driver 19 as a result of extension of the length of the roof top compartment. With such an arrangement, the driver can by turning his head and lifting himself slightly from his seat look directly to the rear through the window in the rear section 35" without use of the mirror. This feature could obviously be useful in occasional driving situations. Unless the vehicle designer wishes to use more complex optical systems (many of which are shown in prior patents), it is preferable when a single, plane mirror 113 is used to have it as far forward as possible to minimize the angle of elevation required by the driver to see the mirror image. Some eye movement by the driver is thought to be beneficial since it overcomes the hypnotic effect of staring straight ahead or at a fixed object, such as even a mirror. In the present arrangement the driver will be continuously shifting his eyes and line of sight from windshield, to mirror, to side windows, etc., and through peripheral vision will be aware of the roof top signal lights, particularly when they vary in intensity. Thus, he is encouraged to remain alert and when alert has the facilities to observe what is happening around him without the interference of the blind spots found in previous automobiles available in the market place.

By placing the signal lights, especially the stop and turn signals, on the roof of the body, the distance from which observation can be made of the driver's manifested intention to stop or turn is greatly increased as compared with the low level front and back signals used heretofore. Preferably, the upper compartment extends transversely across substantially the full width of the automobile so that the signal sections 37 and 39 also indicate the automobile width to others. As indicated, the sections 37 and 39 need not be entirely in the form of signals, as illustrated, but can be a combination sidewall and signal structure serving to act as the complete end closure for each transverse end of the compartment. Many variations in specific structural details are possible within the spirit and principles of the invention and these, of course, will enable the stylists to contribute many unique and distinctive ornamental ideas for use in varying the appearances of vehicles utilizing the invention. The signal lights, of course, can be varied in numerous ways and the vent openings, preferably louvers, also offer numerous opportunities for attractive designs. Functionally, it will be noted that since the vents preferably open into space that is at reduced pressure due to drag or air flow past the compartment they furnish a pressure differential between the interior and exterior of the body that makes it possible to quickly dissipate smoke, odors, etc., and help keep the compartment 17 fresh, clear, and comfortable. It is believed that in this respect they will function more effectively than the well-known separate no-draft side windows previously placed in the window structures of automobiles and that they will be comparable or lower in cost.

Thus, the structures shown by way of illustration of the principles and concepts of the invention accomplish the purpose hereinbefore stated of providing a roof top observation center which facilitates observation by the driver of things outside his vehicle and which facilitates observation of the vehicle by those outside of it. By virtue of the vent openings, the center also contributes to the comfort of the vehicle passengers. Modifications in the specific details shown may be made without departing from the spirit and scope of the invention and the invention is not limited thereto except as required by the claims. Obviously, the invention can be used with different type engines, such as a fuel combustion engine of the external type, electric or fuel cell powered engines, etc. If non-hot-water heating is used because of the flow inducing potential of the vent openings, different heat sources than the exhaust system can be used. Further, where the compartment 29' is added on at the factory as a part of original factory furnished equipment, it is contemplated that the roof opening may be provided with an upstanding lip or flange to facilitate placement and sealing of the compartment on the roof. Also, suitable techniques, including those already known, will be used, as required, to prevent the pressure differential on window 101 or 101' from displacing or loosening it at any time. These and other variations in the precise structures disclosed are within the scope of the invention.

I claim:

1. An observation center for an automobile, said automobile including a body with a front windshield and side sections having windows therein and a roof and back section and defining an interior passenger compartment including a driver's seat, said observation center comprising means forming an upper compartment as a part of said body and located above the level of said roof, said upper compartment extending transversely across a substantial part of the width of the body and opening on its bottom side into said passenger compartment approximately vertically above the driver's seat, said means including a first section forming the top and front of said compartment, said means including a pair of second sections forming respectively the opposite sides of the compartment, said second sections including transparent wall portions facing to at least the side and rear of the body, said means including a third section forming the back of said compartment, said third section being located ahead of the rear ends of the windows in said sidewalls and including a window extending transversely across a substantial part of the width of the body and located vertically above said roof to provide an unobstructed line of sight from said window to and beyond the rearmost portion of the body, rear image viewing optical means in said upper compartment having a line of sight extending through said compartment window and providing a rear image visible to a driver seated in said driver's seat whereby said compartment provides means for the driver to observe the scene at the rear of the body, each of said second sections including signals light means adjacent said transparent wall portions for signalling at least stops and turns whereby said compartment provides means for others to observe from at least the side and rear signals of deceleration and turning of the automobile, said second sections also including signal light means providing parking, running, and emergency lights.

2. The invention as set forth in claim 1 wherein the body is formed of metal and said first section is an integral part of the body and of the same metal and thickness and comprises a cantilever shaped arch having a forward end extending transversely across the body and united with and a part of the metal of the body, said arch being bent upwardly away from the level of the roof section to define the upper compartment.

3. The invention as set forth in claim 2 wherein said third section is a separate part from the body and from the first section and is secured thereto in weathertight joints.

4. The invention as set forth in claim 3 wherein said second sections are separate parts from the body and from the first section and secured thereto in weathertight joints.

5. The invention as set forth in claim 1 wherein said first section is formed of a different material than said body and has a transverse forward end secured to the body, said body having an opening in the portion thereof immediately below said first section to form the bottom side opening of the upper compartment into the passenger compartment.

6. The invention as set forth in claim 5 wherein said second sections include portions that are integral with the first section, said first and second sections forming an add-on part that is secured to the body.

7. The invention as set forth in claim 5 wherein said first section is a molded non-metallic structure.

8. The invention as set forth in claim 7 wherein portions of said second sections are molded integrally with the first section.

9. The invention as set forth in claim 1 wherein the rear image viewing optical means consists of a flat horizontally extending rearwardly facing mirror on substantially the same horizontal level as said compartment window and located adjacent the front end of the upper compartment.

10. The invention as set forth in claim 1 wherein said transparent wall portions also face toward the front of the body whereby said compartment provides means for others to observe from the front signals of deceleration and turning of the vehicle.

11. The invention as set forth in claim 1 wherein said compartment opens unobstructedly into the passenger compartment and the third section is located adjacent to the back of the head of a driver seated in the driver's seat whereby the driver by elevating himself and turning his head can look directly through said window.

12. An observation center for an automobile, said automobile including a body with a front windshield and side sections having windows therein and a roof and back section and defining an interior passenger compartment including a driver's seat, said observation center comprising means forming an upper compartment as a part of said body and located above the level of said roof, said upper compartment extending transversely across a substantial part of the width of the body and opening on its bottom side into said passenger compartment approximately vertically above the driver's seat, said means including a first section forming the top and front of said compartment, said means including a pair of second sections forming respectively the opposite sides of the compartment, said second sections including transparent wall portions facing to at least the side and rear of the body, said means including a third section forming the back of said compartment, said third section being located ahead of the rear ends of the windows in said sidewalls and including a window extending transversely across a substantial part of the width of the body and located vertically above said roof to provide an unobstructed line of sight from said window to and beyond the rearmost portion of the body, rear image viewing optical means in said upper compartment having a line of sight extending through said compartment window and providing a rear image visible to a driver seated in said driver's seat whereby said compartment provides means for the driver to observe the scene at the rear of the body, each of said second sections including signal light means adjacent said transparent wall portions for signalling at least stops and turns whereby said compartment provides means for others to observe from at least the side and rear signals of deceleration and turning of the automobile, said second sections comprising separate signal light fixtures closing the sides of the compartment.

13. The invention as set forth in claim 12 wherein said third section has vent openings therein for the flow of air between the interior of said body and the outside atmosphere and flow control means in the upper compartment for regulating the amount of air flow through said vent openings.

14. The invention as set forth in claim 12 wherein certain portions of said sections are shaped so that air flow past the upper compartment creates a low pressure space immediately adjacent and outside said certain portions, said certain portions having vent openings therein to open into said low pressure space and provide for the flow of air between the interior of the body and said low pressure space, and flow control means for regulating the amount of air flow through the vent openings.

15. An observation center for an automobile, said automobile including a body with a front windshield and side sections having windows therein and a roof and back section and defining an interior passenger compartment including a driver's seat, said observation center comprising means forming an upper compartment as a part of said body and located above the level of said roof, said upper compartment extending transversely across a substantial part of the width of the body and opening on its bottom side into said passenger compartment approximately vertically above the driver's seat, said means including a first section forming the top and front of said compartment, said means including a pair of second sections forming respectively the opposite sides of the compartment, said second sections including transparent wall portions facing to at least the side and rear of the body, said means including a third section forming the back of said compartment, said third section being located ahead of the rear ends of the windows in said sidewalls and including a window extending transversely across a substantial part of the width of the body and located vertically above said roof to provide an unobstructed line of sight from said window to and beyond the rearmost portion of the body, rear image viewing optical means in said upper compartment having a line of sight extending through said compartment window and providing a rear image visible to a driver seated in said driver's seat whereby said compartment provides means for the driver to observe the scene at the rear of the body, each of said second sections including signal light means adjacent said transparent wall portions for signalling at least stops and turns whereby said compartment provides means for others to observe from at least the side and rear signals of deceleration and turning of the automobile, certain portions of said sections being shaped so that air flow past the upper compartment creates a low pressure space immediately adjacent and outside said certain portions, said third section having vent openings therein to open into said low pressure space and provide for the flow of air between the interior of the body and said low pressure space, and flow control means for regulating the amount of air flow through the vent openings.

16. An observation center for an automobile, said automobile including a body with a front windshield and side sections having windows therein and a roof and back section and defining an interior passenger compartment including a driver's seat, said observation center comprising means forming an upper compartment as a part of said body and located above the level of said roof, said upper compartment extending transversely across a substantial part of the width of the body and opening on its bottom side into said passenger compartment approximately vertically above the driver's seat, said means including a first section forming the top and front of said compartment, said means including a pair of second sections forming respectively the opposite sides of the compartment, said second sections including transparent wall portions facing to at least the side and rear of the body, said means including a third section forming the back of said compartment, said third section being located ahead of the rear ends of the windows in said sidewalls and including a window extending transversely across a substantial part of the width of the body and located vertically above said roof to provide an unobstructed line of sight from said window to and beyond the rearmost portion of the body, rear image viewing optical means in said upper compartment having a line of sight extending through said compartment window and providing a rear image visible to a driver seated in said driver's seat whereby said compartment provides means for the driver to observe the scene at the rear of the body, each of said second sections including signal light means adjacent said transparent wall portions for signalling at least stops and turns whereby said compartment provides means for others to observe from at least the side and rear signals of deceleration and turning of the automobile, certain portions of said sections being shaped so that air flow past the upper compartment creates a low pressure space immediately adjacent and outside said certain portions, said certain portions having vent openings therein to open into said low pressure space and provide for the flow of air between the interior of the body and said low pressure space, flow control means for regulating the amount of air flow through the vent openings, said automobile having an engine and a heat source means other than a cooling system for the engine and including a heater in heat exchange relationship with the heat source and a hot air conduit connecting the heater to the passenger compartment, operation of said flow control means to open said vent openings serving to induce flow through said hot air conduit.

* * * * *